(12) United States Patent
Georgelos et al.

(10) Patent No.: US 11,117,710 B2
(45) Date of Patent: Sep. 14, 2021

(54) VALVE ASSEMBLY FOR BAGS

(71) Applicant: RAPAK, LLC, Bloomfield Hills, MI (US)

(72) Inventors: Paul N. Georgelos, Naperville, IL (US); Kosmas Kasimatis, Chicago, IL (US); Ronald E. Kieras, Woodstock, IL (US); Matt Ruschmeier, Glencoe, IL (US)

(73) Assignee: RAPAK, LLC, Bloomfield Hills, MI (US)

( * ) Notice: Subject to any disclaimer, the term of this patent is extended or adjusted under 35 U.S.C. 154(b) by 51 days.

(21) Appl. No.: 16/204,830

(22) Filed: Nov. 29, 2018

(65) Prior Publication Data
US 2019/0168918 A1    Jun. 6, 2019

Related U.S. Application Data

(60) Provisional application No. 62/594,279, filed on Dec. 4, 2017.

(51) Int. Cl.
*F16K 15/16* (2006.01)
*F16K 15/14* (2006.01)
(Continued)

(52) U.S. Cl.
CPC ........... *B65D 31/14* (2013.01); *B65D 77/225* (2013.01); *F16K 15/147* (2013.01); *F16K 15/16* (2013.01)

(58) Field of Classification Search
CPC ......... Y10T 137/7889; Y10T 137/7891; Y10T 137/7888; B65D 31/14; B65D 77/225; F16K 15/147; F16K 15/16; F16K 15/144
(Continued)

(56) References Cited

U.S. PATENT DOCUMENTS 2,579,724 A * 12/1951 Breakstone .......... B67D 1/0456
                                                    215/247
6,070,624 A *  6/2000 Bilbrey ................ B67D 1/0829
                                                    137/625.19
(Continued)

FOREIGN PATENT DOCUMENTS

DE       10342406         3/2004
EP        2951104        12/2015
(Continued)

OTHER PUBLICATIONS

IPO Examination Report, Application No. GB 1819783.0, dated Apr. 8, 2020, 1 page.
(Continued)

*Primary Examiner* — Jessica Cahill
(74) *Attorney, Agent, or Firm* — McDonald Hopkins LLC

(57) ABSTRACT

A present application relates to a valve assembly for use with a liquid container. The valve assembly includes a spout containing an opening to the liquid container, the spout being configured to form a liquid-tight seal with a housing. A sleeve extends through the housing toward the liquid container through the opening. A valve is secured to the housing and extending into the opening through the sleeve and forming a liquid-tight seal with the sleeve. The valve includes a body portion with a cutaway section and a leg fixed to the valve by a hinge, wherein the leg is configured to flex outwards against the sleeve upon insertion of a tube into the valve causing the cutaway section to open a flow channel to allow liquid to flow through the valve assembly.

6 Claims, 13 Drawing Sheets

(51) Int. Cl.
*B65D 30/24* (2006.01)
*B65D 77/22* (2006.01)

(58) Field of Classification Search
USPC .......................................................... 137/855
See application file for complete search history.

(56) References Cited

U.S. PATENT DOCUMENTS

| | | | |
|---|---|---|---|
| 8,397,958 B2 * | 3/2013 | Smith | B65D 47/2031 |
| | | | 222/494 |
| 8,459,511 B2 | 6/2013 | Darby | |
| 8,820,591 B2 | 9/2014 | Smith et al. | |
| 8,973,789 B2 | 3/2015 | Smith et al. | |
| 9,010,589 B2 * | 4/2015 | Thurman | B65D 47/2037 |
| | | | 222/494 |
| 9,061,811 B2 * | 6/2015 | Egersdoerfer | F16K 17/19 |
| 9,573,736 B2 | 2/2017 | Arch et al. | |
| 9,592,944 B2 * | 3/2017 | Johnson | B65D 75/5872 |
| 9,850,041 B2 | 12/2017 | Arch et al. | |
| 10,151,396 B2 * | 12/2018 | Nguyen | B65D 31/147 |
| 10,227,167 B2 | 3/2019 | Darby et al. | |
| 2003/0045841 A1 * | 3/2003 | Palcisko | A61J 15/0092 |
| | | | 604/256 |
| 2007/0138423 A1 * | 6/2007 | Smith | F16K 15/063 |
| | | | 251/148 |
| 2008/0185061 A1 * | 8/2008 | Fisk | F16K 15/147 |
| | | | 137/846 |
| 2008/0245816 A1 | 10/2008 | Armstrong et al. | |
| 2010/0176152 A1 * | 7/2010 | Johnson | B65D 75/5877 |
| | | | 222/92 |
| 2015/0336719 A1 * | 11/2015 | Bradley | B65D 47/06 |
| | | | 220/212 |
| 2017/0001771 A1 | 1/2017 | Oostveen | |
| 2018/0079564 A1 * | 3/2018 | Darby | B65D 85/80 |
| 2020/0009598 A1 | 1/2020 | Johnson | |

FOREIGN PATENT DOCUMENTS

| | | |
|---|---|---|
| GB | 2464720 | 4/2010 |
| WO | 0222444 | 3/2002 |
| WO | 2007081663 | 7/2007 |
| WO | 2009026441 | 2/2009 |
| WO | 2016087835 | 6/2016 |

OTHER PUBLICATIONS

IPO Search and Examination Report, Application No. GB 1911338.0, dated Feb. 6, 2020, 6 pages.

* cited by examiner

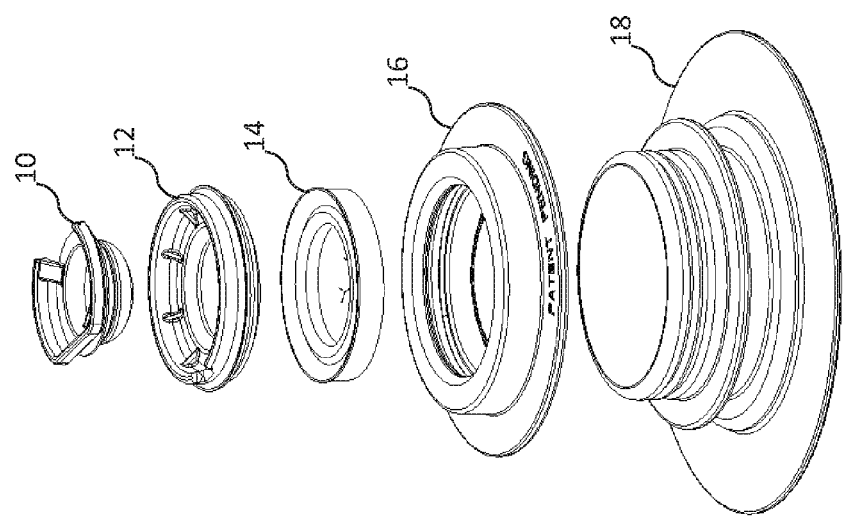

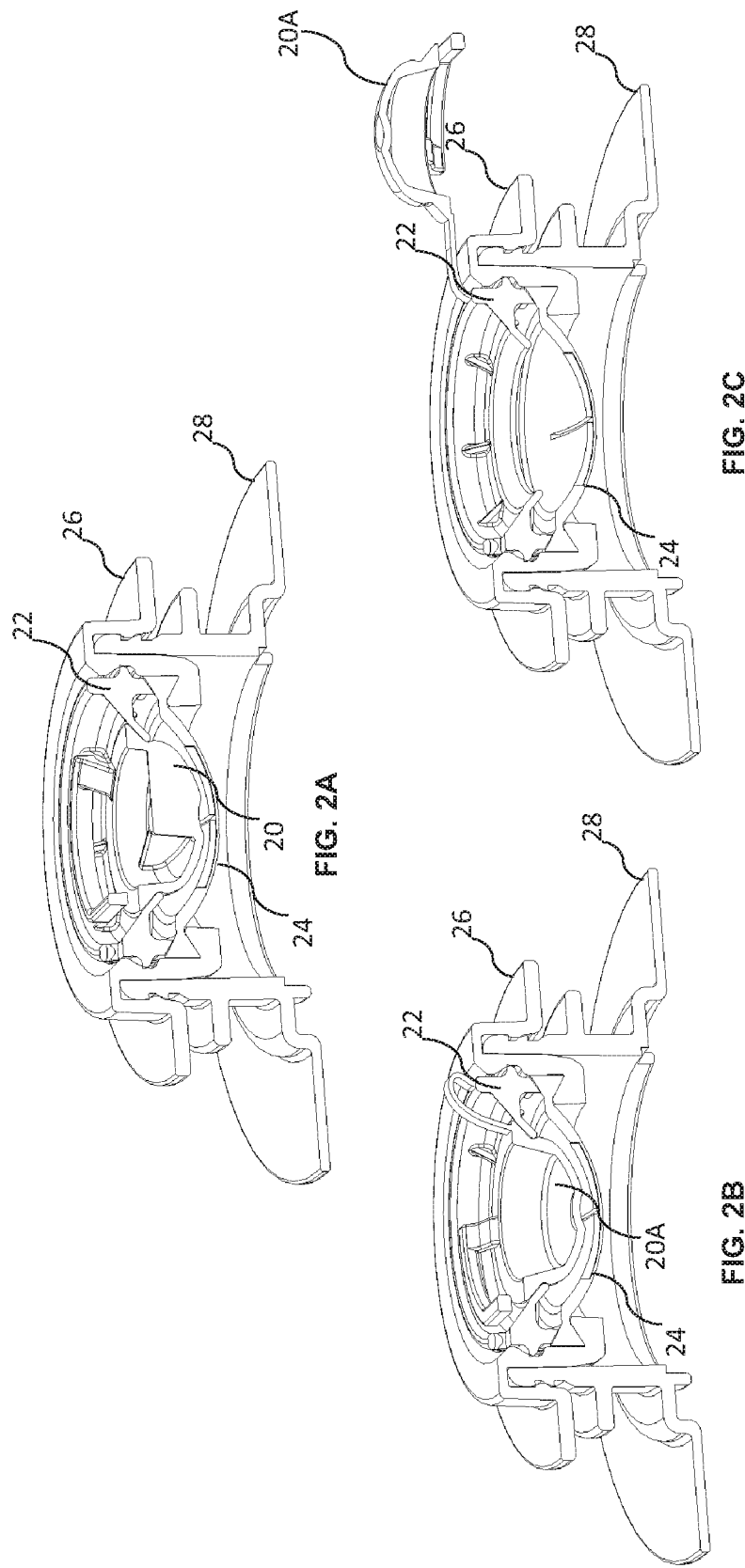

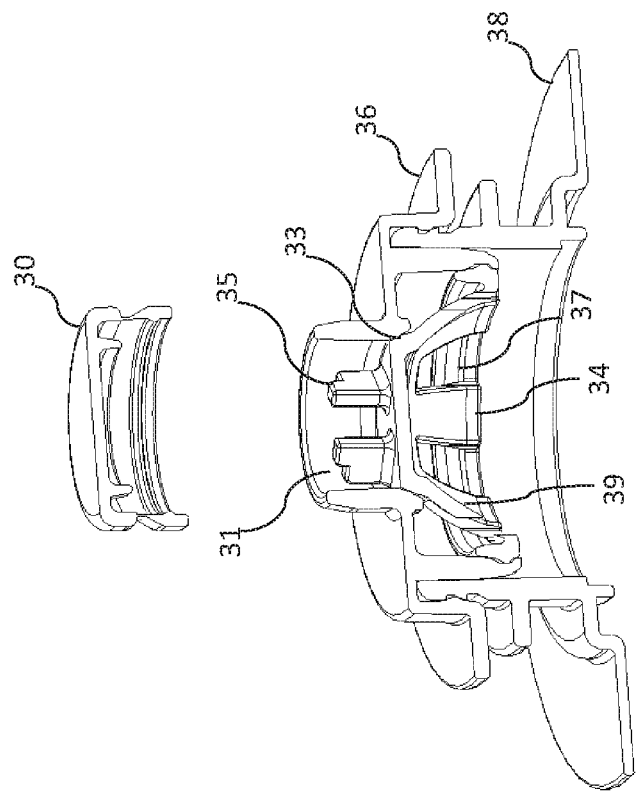
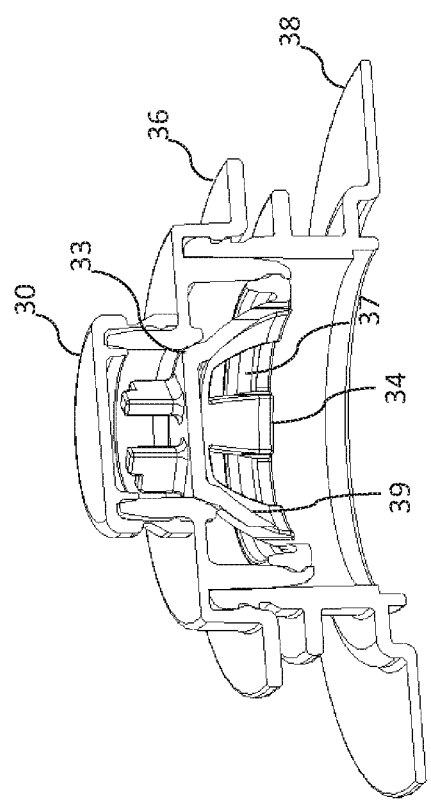

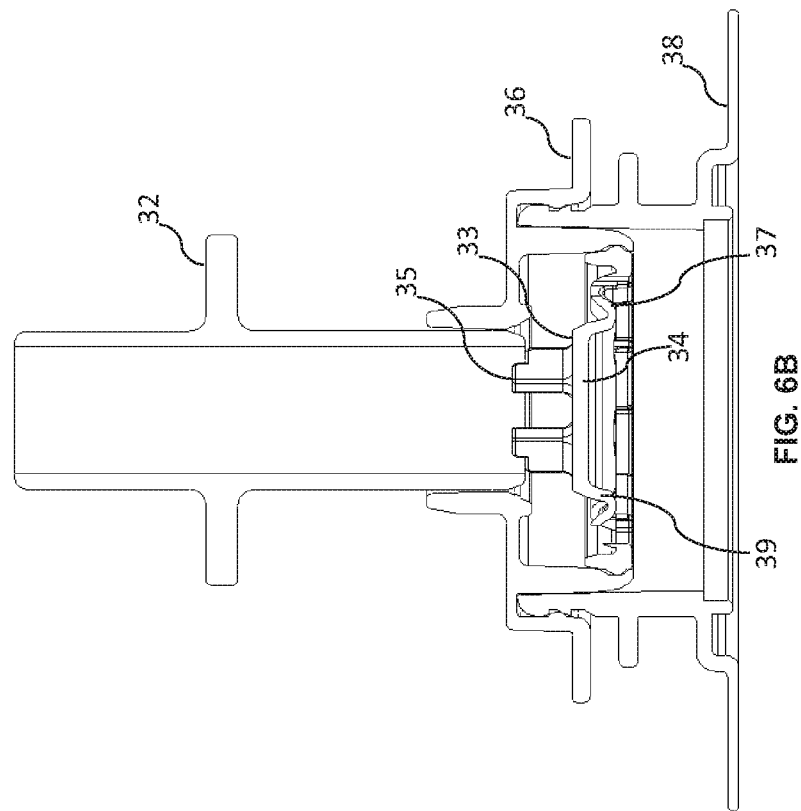
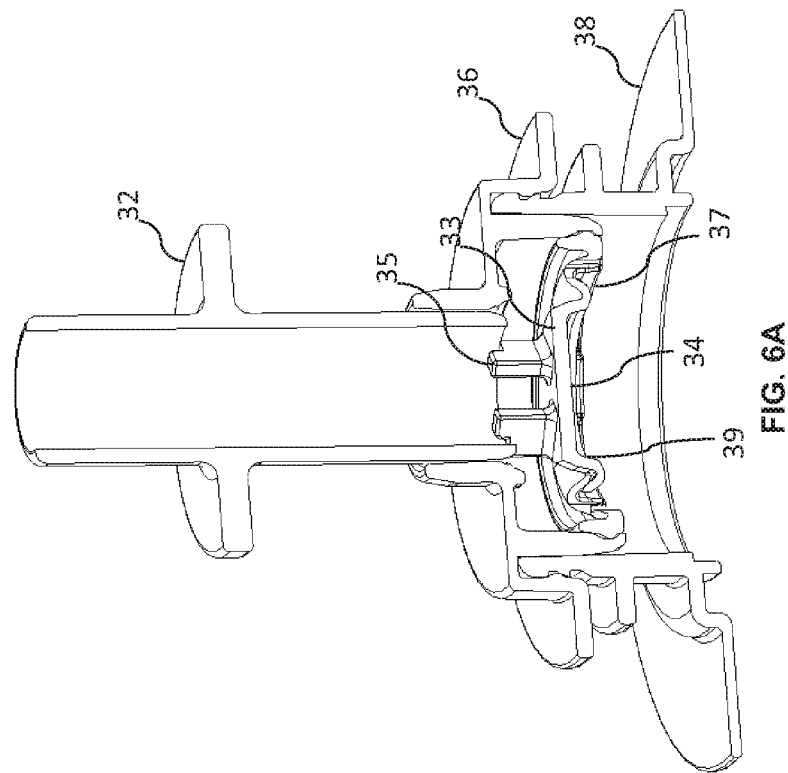

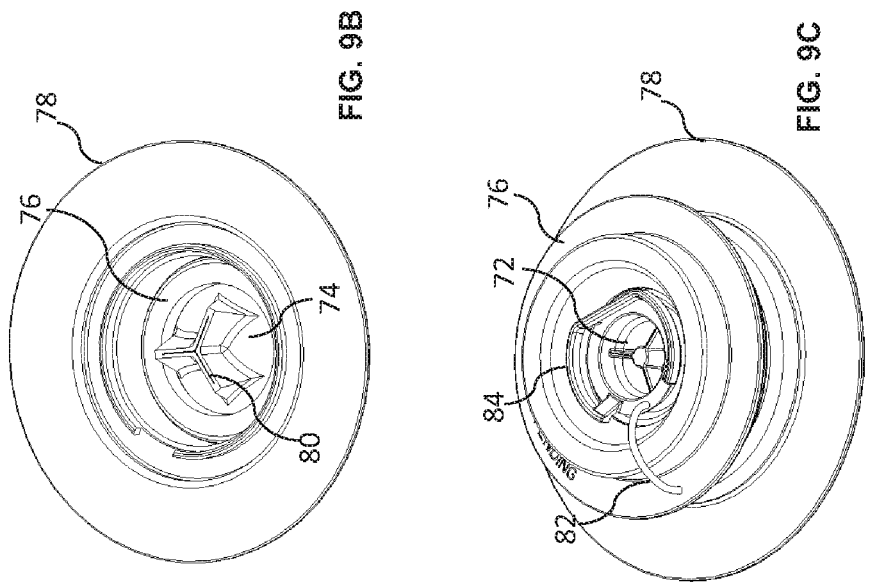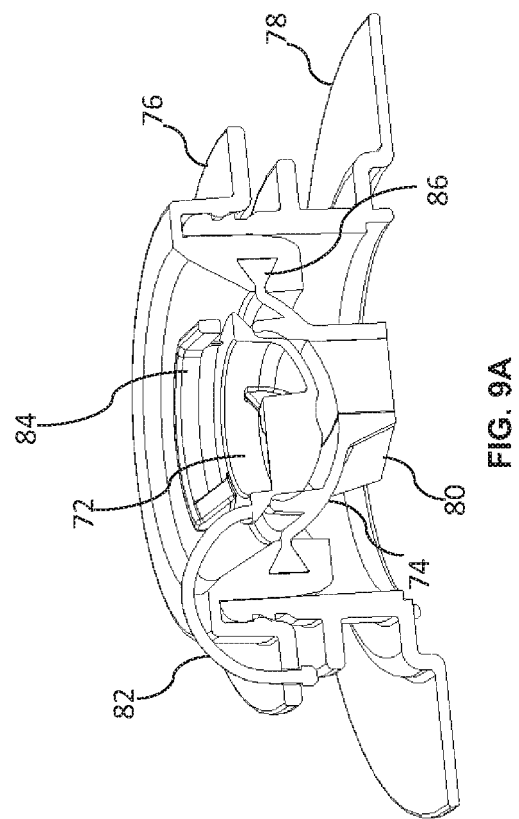

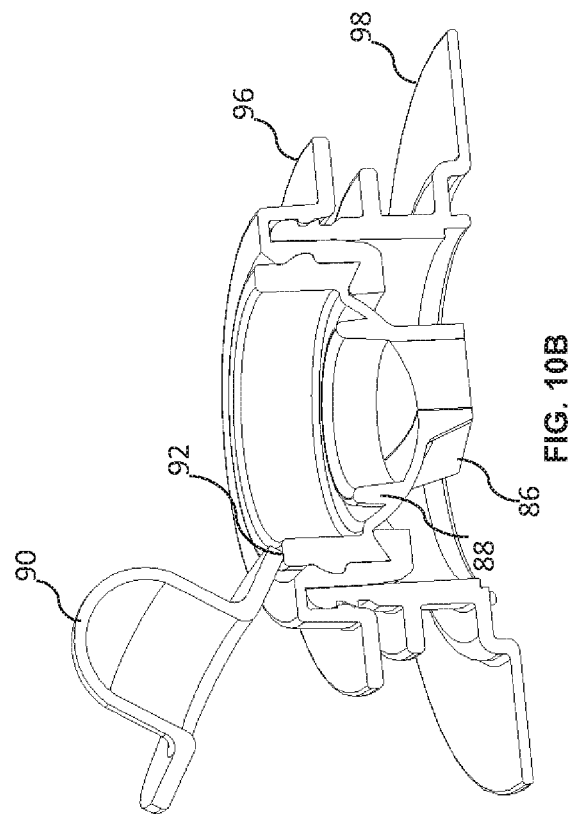
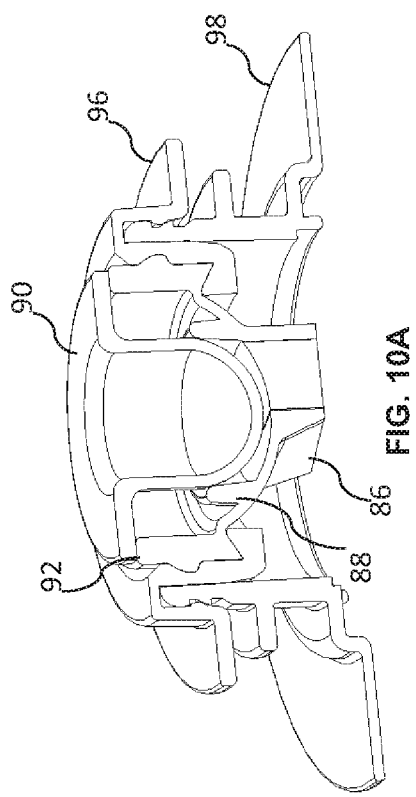

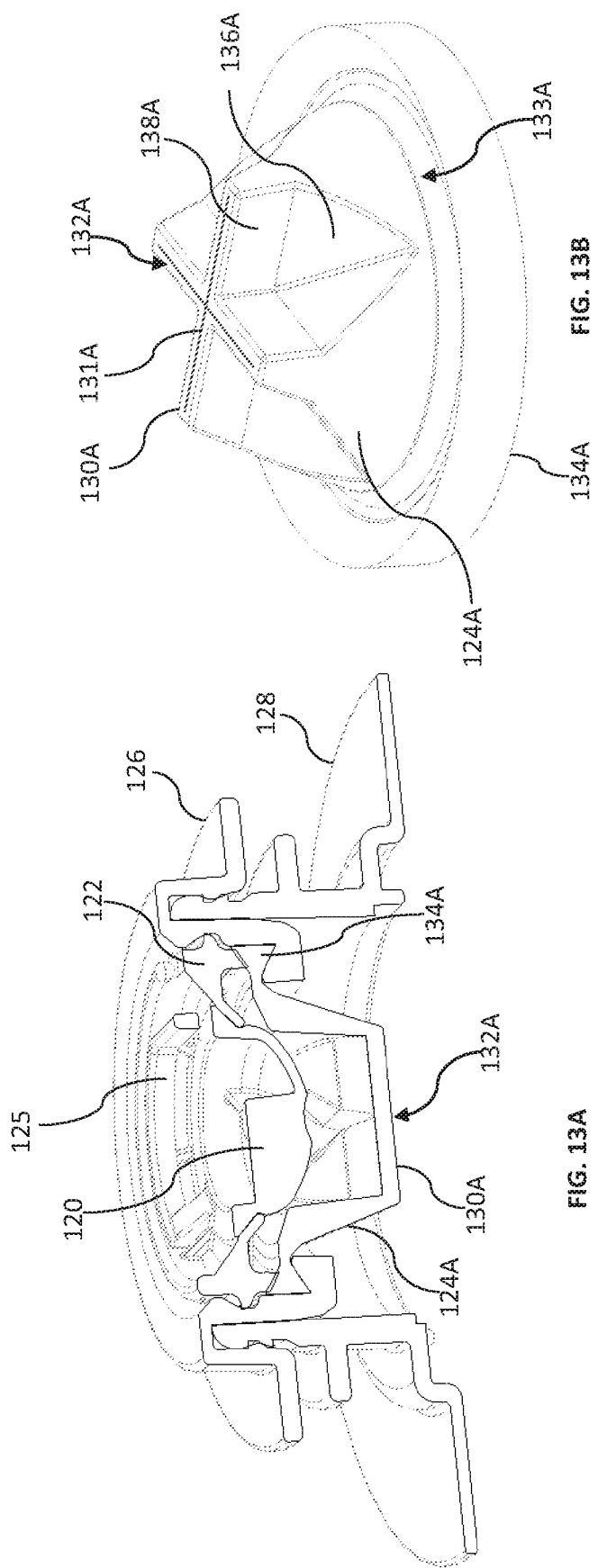

VALVE ASSEMBLY FOR BAGS

CROSS-REFERENCE TO RELATED APPLICATIONS

This patent application claims priority to and the benefit of U.S. Provisional Patent Application Ser. No. 62/594,279 filed on Dec. 4, 2017, which is incorporated herein by reference in its entirety.

BACKGROUND

Generally, this application relates to systems and methods for producing dispensing components for packaging, and specifically for valve assemblies for flexible packaging designed to cooperate with equipment to dispense beverages (e.g., smoothies) and dairy based products at restaurants, convenience stores, etc.

An example of conventional valve assembly is shown in FIG. 1. The valve assembly of FIG. 1 is configured to be secured to a flexible polyethylene liner or bag with a fitment or spout 18. A housing 16 secures one or more components to the spout 18. For example, a retaining ring 12 can hold a silicone valve 14 in place, and a dust cap 10 can protect an exposed portion of the valve 14, such as during transport and storage. In examples, the spout 18 is aligned with a hole in the bag through which a tube (or probe or dispenser) can be inserted into the bag to extract the contents therein. The valve 14 can accept the flexible dispensing tube, such as by puncturing or otherwise deforming the valve 14, to allow a flow of liquid from the liner bag when engaged with beverage dispensing equipment, and then flex back to a closed state when the tube is removed from the valve 14.

It can involve significant production costs to separately produce the various components from different materials and then assembling the valve system, and the use of some materials significantly increases the cost of the valve.

SUMMARY

Certain embodiments of the present technology relate to a valve assembly for use with dispensing components for packaging, specifically for flexible packaging designed to cooperate with equipment to dispense beverages.

BRIEF DESCRIPTION OF SEVERAL VIEWS OF THE DRAWINGS

FIG. 1 illustrates an exploded view of a valve assembly.

FIGS. 2A-2C illustrate cutaway side views of another valve assembly according to certain inventive techniques.

FIGS. 4A-4B illustrate cutaway side views of the valve assembly illustrated in FIGS. 3A-3C according to certain inventive techniques.

FIGS. 6A-6B illustrate cutaway side views of the valve assembly illustrated in FIGS. 3A-3C according to certain inventive techniques.

FIG. 9A illustrates a cutaway side view of another valve assembly according to certain inventive techniques.

FIG. 9B illustrates a perspective view of a first side of the valve assembly illustrated in FIG. 9A according to certain inventive techniques.

FIG. 9C illustrates a perspective view of a second side of the valve assembly illustrated in FIG. 9A according to certain inventive techniques.

FIGS. 10A-10B illustrate cutaway side views of still another valve assembly according to certain inventive techniques.

FIG. 13A illustrates a cutaway side view of another valve assembly according to certain inventive techniques.

FIG. 13B illustrates a perspective view of the valve assembly illustrated in FIG. 13A according to certain inventive techniques.

Figure 3B:
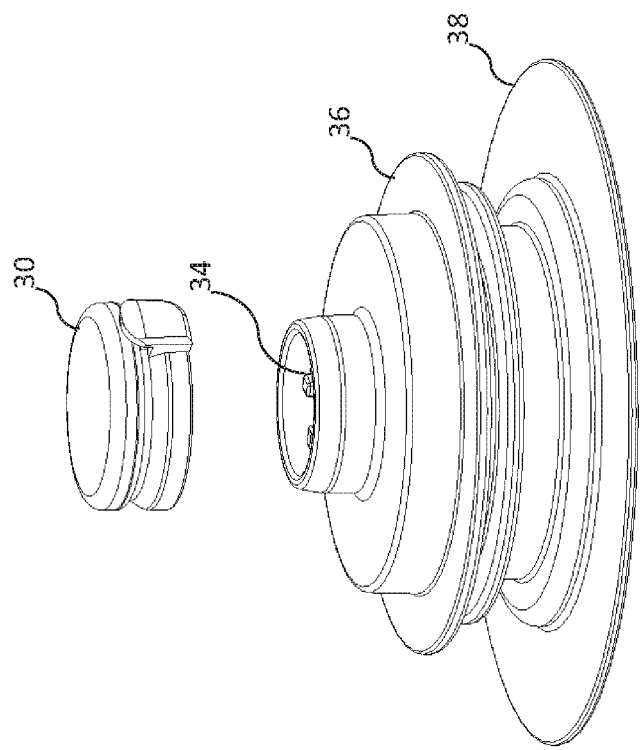
FIGS. 3A-3B illustrate perspective views of another valve assembly according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

In disclosed examples, a valve assembly for use with a liquid container includes a spout containing an opening to the liquid container, the spout configured to form a liquid-tight seal with a housing, a sleeve to extend through the housing toward the liquid container through the opening, and a valve secured to the housing and extending into the opening through the sleeve and forming a liquid-tight seal with the sleeve, the valve including a body portion that includes a cutaway section and a leg fixed to the valve by a hinge, wherein the leg is configured to flex outwards against the sleeve upon insertion of a tube into the valve causing the cutaway section to open a flow channel to allow liquid to flow through the valve assembly.

In some examples, the valve includes a first material and the sleeve includes a second material, the first material being rigid in comparison to the second material. In examples, the first material includes a polyethylene material or a polypropylene material. In examples, the second material includes a thermoplastic elastomer material.

In examples, a cap is secured to the assembly, the cap configured to cover the valve in a first position and expose the valve in a second position. In some examples, the valve is formed in an injection molding process.

In some disclosed examples, a valve assembly for use with a liquid container, which includes a valve configured to accept a tube for liquid transfer to or from the liquid container, a spout containing an opening to the liquid container, the spout configured to form a liquid-tight seal with a housing, wherein the housing is formed as an overmold to the valve.

In examples, the housing and the valve are formed by a dual injection molding process, the housing being formed by a first material and the valve being formed by a second material. In some examples, a portion of the valve formed by the second material is fully encased by the first material that forms the housing, creating a seal between the valve and the housing. In examples, one of the first material or the second material includes one of a polyethylene material, a polypropylene material, or a thermoplastic elastomer material.

In examples, a cap is secured to the assembly, the cap configured to cover the valve in a first position and expose the valve in a second position.

In some disclosed examples, a valve assembly for use with a liquid container includes a flexible valve formed with a cap that can snapably close off the top of the valve, a housing that secures the valve, and a spout to which the housing is secured, wherein the valve is configured to accept a tube for liquid transfer to or from the liquid container.

In examples, the tube is dimensioned to fit within an opening of the housing to create a liquid tight seal between an internal wall of the opening and an external wall of the tube when the tube is inserted into the opening.

In some examples, the flexible valve includes a raised portion including one or more elements extending from the valve into the opening, the raised portion formed to mate with the tube when the tube is inserted into the opening. In examples, the flexible valve includes one or more valve walls that are configured to deform from an expanded position to a collapsed position in response to insertion of the tube, and return to the expanded position upon removal of the tube from the housing. In examples, the flexible valve is configured to form a seal with the housing when the valve walls are in the expanded position, and reveal a space between the tube and the valve to allow fluid to flow between the tube and the valve in the collapsed position.

In some examples, the flexible valve further including one or more voids spaced between the one or more valve walls to allow fluid to flow through the valve. In examples, the valve includes a flexible material such as one of a polyethylene material, a polypropylene material or a thermoplastic elastomer material. In examples, the flexible valve includes a duckbill valve. In some examples, the cap is connected to the flexible valve by a hinge.

One embodiment of the present technology, as illustrated in FIGS. 2A-2C, includes a spout or fitment 28 secured or otherwise formed on a bag (e.g. a liquid dispensing bag or container) at an opening. A housing 26 is configured to removably connect with the spout 28 (e.g., screwed on, secured by adhesive, pressure-fit, force clip, etc.). A valve 24 is secured between the housing 26 and a retaining ring 22. In the example of FIGS. 2A-2C, the valve 24 is formed of thermoplastic elastomers ("TPE") by an injection molding process, for instance. The valve 24 can include a scoring pattern to allow a protrusion, such as a dispensing tube, to break through the valve 24 at the surface weakened by the scoring. The valve can be molded with partially scored weld lines designed to break open and allow a probe to penetrate into the bag yet seal back up once the probe is extracted. The flexibility of the TPE allows the valve 24 to form a seal around the tube while inserted, while allowing the valve 24 to return to its original shape when the tube is removed.

As shown in FIG. 2A, a cap 20 is placed over the valve 24 to ensure contaminants are prevented from making contact with the valve 24. Cap 20 can be formed as a separate component and secured in place in the retaining ring 22 by pressure, snap-fit, etc. In the examples of FIGS. 2B and 2C, cap 20A can be tethered to the retaining ring 22, to ensure the cap 20A is not discarded while the valve 24 is accessed and liquids such as beverages are being dispensed.

The spout 28, retaining ring 22, and dust cap 20, 20A can each be formed through an injection molding process or other suitable manufacturing technique. The components can be made of a more rigid plastic such as, by way of example, polypropylene.

By way of example, the cap 20 can be snapably connected to the retaining ring 22 by an interlocking or interconnecting mechanism; however, the cap 20 can be connected to the retaining ring 22 in any number of other ways. Further, the retaining ring 22 can be snapably connected to the housing 26, or screwed together, secured by adhesive, integrally formed, or secured by other means. As shown, the retaining ring 22 is configured to secure the valve 24 between the retaining ring 22 and the housing 26 by pressure (e.g., pressure-fit, etc.); however, other means consistent with this disclosure are also contemplated.

Figure 3A:
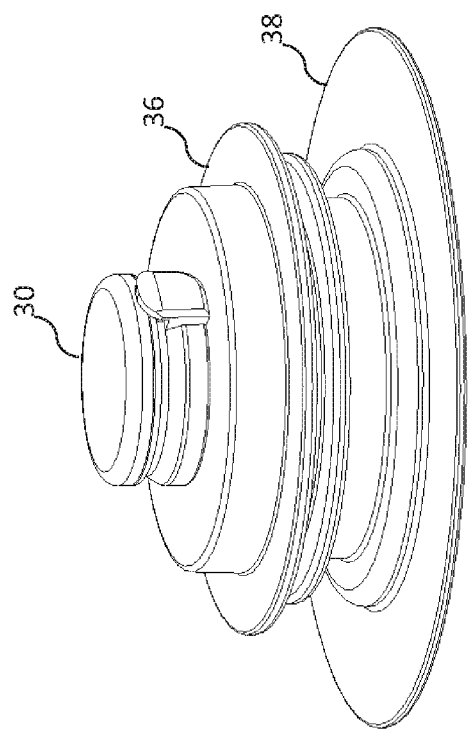

FIGS. 3A-3B illustrate perspective views of another valve assembly according to certain inventive techniques. A dust cap 30 closes an opening of a housing 36, which is secured to a spout 38. As shown in FIG. 3B, removal of the dust cap 30 reveals a valve 34, which is described in greater detail with respect to FIGS. 4A-6B.

As shown in the cutaway side views of FIGS. 4A-4B, valve walls 39 of valve 34 are separated by one or more voids 37. However, a portion 33 of the valve 34 forms a seal with the housing 36, even in the absence of dust cap 30. A raised portion 35 of the valve 30 is presented upon removal of the dust cap 30. The valve 34 is configured to cooperate with a dispensing tube 32, as shown in FIGS. 5A-5C and 6A-6B. For example, the tube 32 can be dimensioned to fit within an opening 31 of the housing 36 such that a seal is formed between an internal wall of the opening 31 and an external wall of the tube 32 when the tube 32 is inserted. The raised portion 35 is formed to mate with the tube 32, as shown in FIG. 5B, such that a downward force from the tube 32 deforms the valve 34.

Figure 5C:
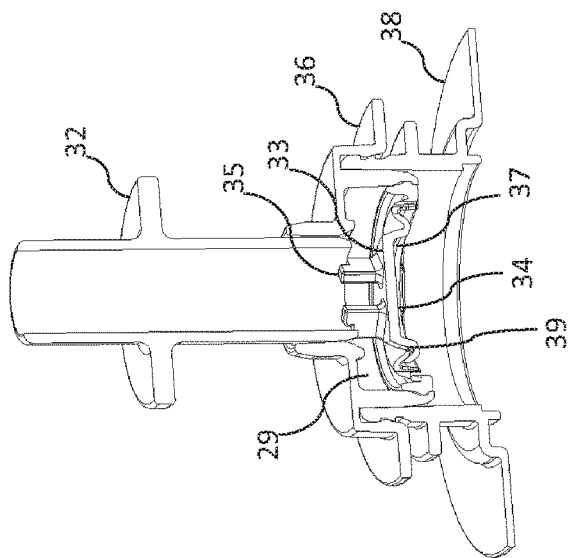
FIGS. 5A-5C illustrate cutaway side views of the valve assembly illustrated in FIGS. 3A-3C according to certain inventive techniques.
Figure 5B:
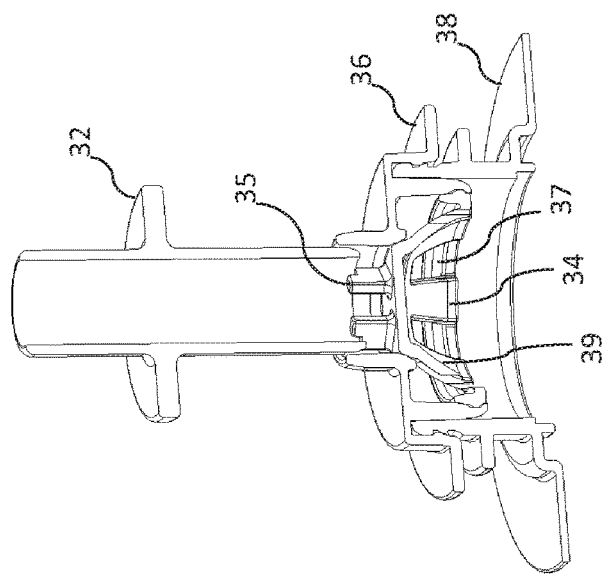
Figure 5A:
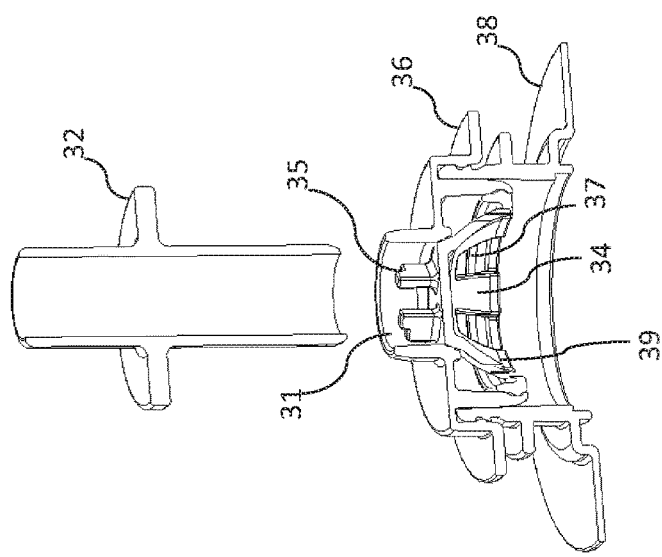

As shown in FIG. 5C, the force against the raised portion 35 collapses the valve walls 39 of the valve 34 such that the seal between the portion 33 and the housing 36 is broken. As shown, the raised portion 35 includes several distinct elements extending from the valve 34 into the opening 31, such that upon insertion of the tube 32, fluid is free to flow into a space 29 between the valve 34 and the housing 36, through the void(s) 37 and into the tube 32. The valve 34 can be made of a flexible material such as, by way of example, TPE.

When the tube 32 is removed from the valve assembly, the valve walls 39 expand and the valve 34 moves back into the original position without the force from the tube 32 in accordance with the elastic recovery characteristics of the valve 34. The portion 33 then re-engages the housing 36 to form a seal thereby preventing fluid from escaping through the valve 34.

Figure 7A:
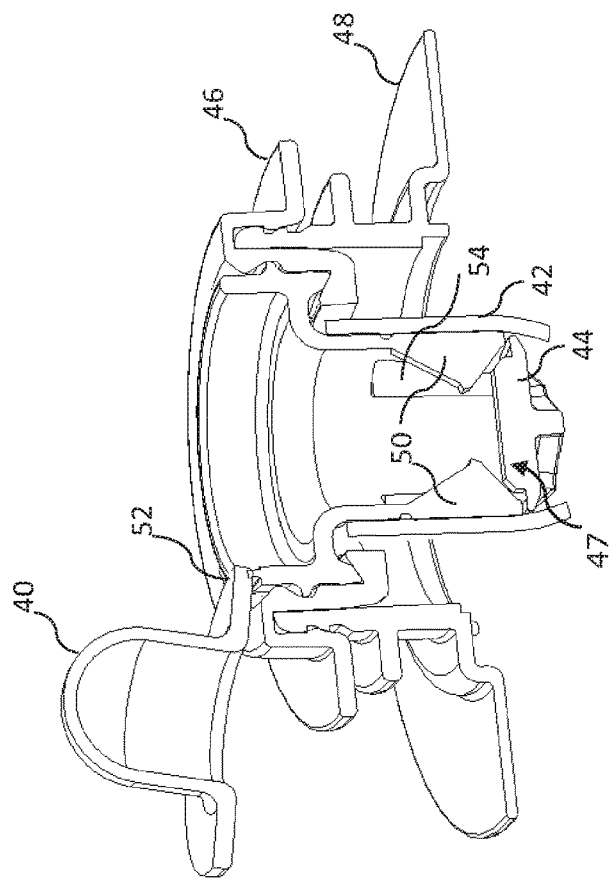
FIGS. 7A-7B illustrate cutaway side views of another valve assembly according to certain inventive techniques.
Figure 7B:
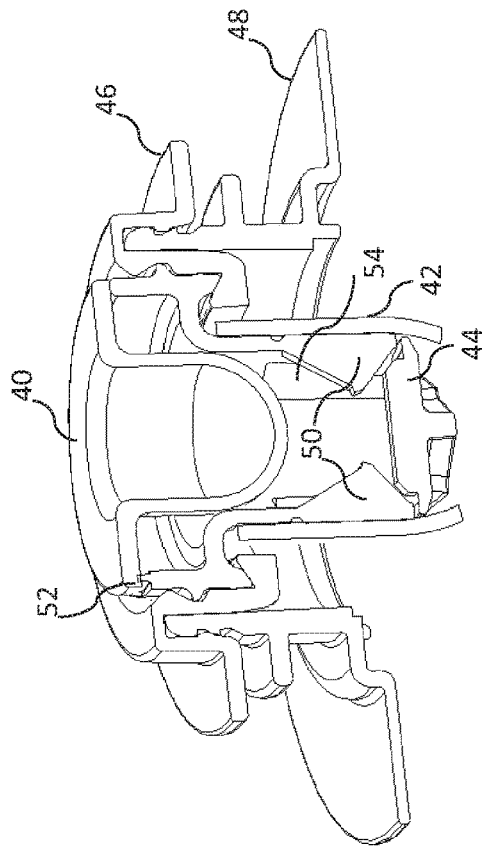

FIGS. 7A-7B illustrate cutaway side views of a valve assembly according to certain inventive techniques. As shown, a spout 48 is connected to and holds a housing 46 in place. The housing 46 securably retains a flexible outer shell or sleeve 42 into which a valve 44 is placed. By way of example, the sleeve 42 may be pinched between the valve 44 and housing 46. Alternatively, the sleeve 42 may be formed with the housing 46 or with the valve 44. No retaining ring is necessary to hold the valve 44 in the housing 46. Thus, the sleeve 42 and the valve 44 extend into the liquid dispensing bag through an opening in the spout 48. The valve 44 can include an integrally formed cap 40, which can be tethered by a joint or hinge 52.

The valve 44 includes one or more legs 50 in contact with the sleeve 42. For example, the valve 44 can be made of a more rigid material (e.g., polypropylene), whereas the sleeve 42 can be a more flexible material (e.g., TPE) such that a seal is formed between the outer portion of the valve 44 (including the bottom portion 47 of the valve 44) and the inner wall of the sleeve 42 when the valve 44 is inserted into the sleeve 42. The leg(s) 50 are hinged with respect to a body portion of the valve 44 such that the leg(s) 50 flex outwards from the body portion of the valve 44 when a tube is inserted into the valve 44.

Figure 8B:
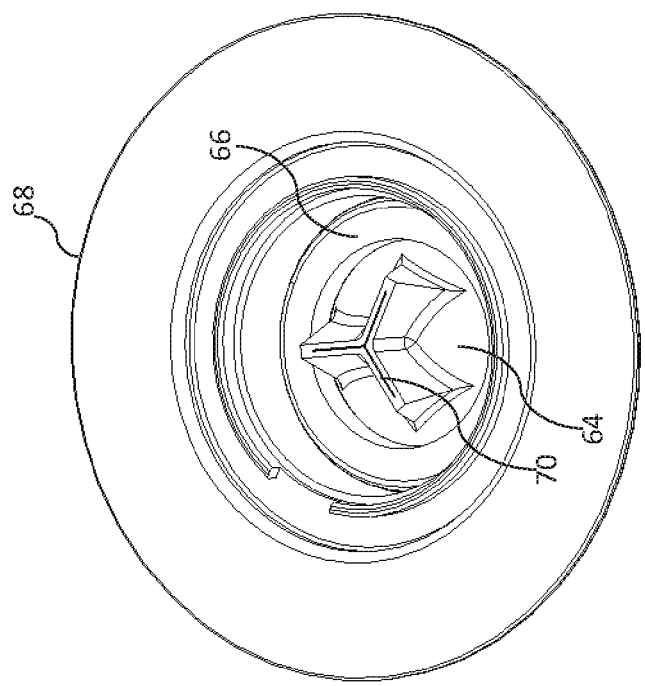
FIG. 8B illustrates a perspective view of the valve assembly illustrated in FIG. 8A according to certain inventive techniques.
Figure 8A:
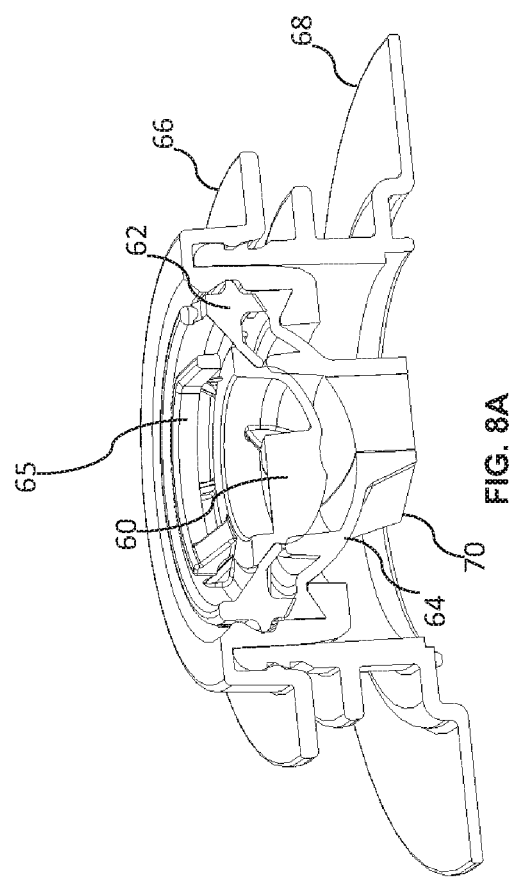
FIG. 8A illustrates a cutaway side view of another valve assembly according to certain inventive techniques.

As shown, a cutaway section 54 in a wall of the body portion of the valve 44 defines a flow channel around the valve 44 to ease the flow of liquid through the valve assembly when the valve 44 is opened and the leg(s) 50 flex outward. Thus, when a tube is inserted into the valve 44, the tube pushes the hinged legs 50 outward and the legs 50 in turn push the sleeve 42 walls outward such that the sleeve 42 is no longer sealingly engaged to the bottom portion 47 of the valve 44. Thus, fluid can flow between the bottom portion 47 and the sleeve 42. In this way, fluid can pass through the valve 44 and tube and into the beverage dispensing device. The leg(s) 50 may be designed to cover a portion or the whole of the cutaway section 54 when no tube is inserted into the valve 44. Example valves are shown in U.S. Pat. No. 8,459,511, which is incorporated by reference FIG. 8A illustrates a cutaway side view of another valve assembly according to certain inventive techniques. As shown, a housing 66 is removably secured to a spout 68. A cap 60 is snapably secured to a retaining ring 62 by a snap-fit closure and/or other means. In some examples, the cap 60 includes a tab 65 to facilitate removal of the cap 60 from the retaining ring 62. The cap 60 is configured to be inserted into a valve 64 to prevent contaminants entering into the valve 64. In this example, the valve 64 includes one or more opening slots 70. For example, as seen in FIGS. 8A and 8B, each slot 70 can be formed by a pair of walls that extend from a surface of the valve 64 and terminate at a joint. The opening can be formed by scoring the joint, cutting the walls where they meet, or forming a thinner layer of material at the joint, such that the valve 64 normally remains closed in the absence of an inserted tube. The valve 64 can be made of flexible material such as TPE.

In the example of FIGS. 8A and 8B, the walls of each of the three slots 70 can meet at a central point to form a generally Y-shape by the joints. The joints can be separated by the insertion of a tube, as the scored portion results in a joint that is separable and otherwise deformable, such that when the tube is inserted into the valve 64, the walls of the slots 70 flex outward around the tube to create an opening through which the fluid can flow through the valve 64 and into the inserted tube.

Although illustrated with three slots that meet centrally to form a Y-shape, a single slot or four or more such opening slots are also considered. Further, the configuration of the opening slots 80, where the walls extend from a surface to meet at a joint, may also be referred to as a "duckbill" type valve.

FIG. 9A illustrates a cutaway side view of a valve assembly according to certain inventive techniques. As shown, a housing 76 is removably secured to a spout 78. A cap 72 is snapably secured to the housing 76 by a snap-fit closure and/or secured by a tether 82. In some examples, the cap 72 includes a tab 84 to facilitate removal of the cap 60 from the retaining ring 72. The cap 72 is configured to be inserted into a valve 74 to prevent contaminants entering into the valve 74. In this example, the valve 74 includes one or more opening slots 80, similar to opening slots 70 of FIGS. 8A and 8B.

Additionally or alternatively, one or more of the components of the valve assembly can be formed by an overmolding process. For example, the valve 74 can be formed by any suitable technique (e.g., by injection molding). The formed valve 74 can then be secured in another mold configured to form the housing 78 over the valve 74. Alternatively, the housing 78 can be formed first and then placed in a mold and the valve 74 can be formed with the housing 78. Alternatively, the housing 78 and the valve 74 can be formed by a dual injection molding process. In these manners, a portion 86 of the valve 74 can be fully encased by material that forms the housing 78, creating a seal between the valve 74 and the housing 78 without the use of a retaining ring or other securing means. The valve 74 can be made of a flexible material (such as TPE) and the housing 78 can be made of a more rigid material, such as polypropylene.

FIGS. 10A-10B illustrate cutaway side views of another valve assembly. The assembly employs a housing 96 that is removably secured to a spout 98. In the example of FIGS. 10A-10B, a valve 88 includes an integrally formed cap 90, which is secured to the valve 88 by a hinge or tether 92. The cap 90 is configured to be inserted into the valve 88 to prevent contaminants entering into the valve 88. In this example, the valve 88 includes one or more opening slots 86, similar to opening slots 70 of FIGS. 8A and 8B. The valve 88 may be snapably secured to the housing 96 without use of a retaining ring. The whole valve assembly 88 (valve 88 and cap 90) can be formed of a flexible material such as TPE.

Figure 11B:
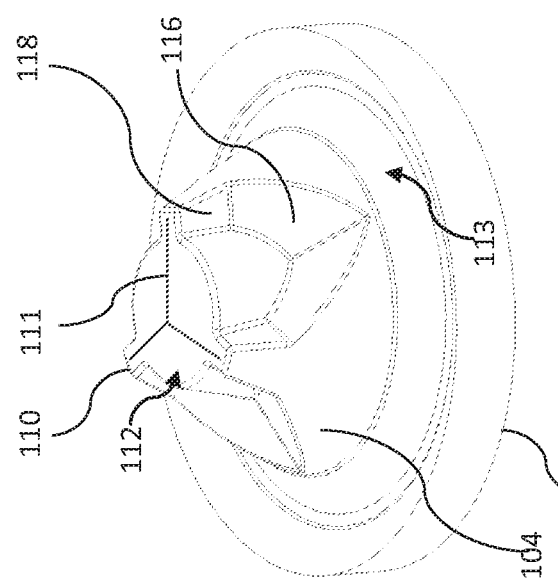
FIG. 11B illustrates a perspective view of the valve assembly illustrated in FIG. 11A according to certain inventive techniques.
Figure 11A:
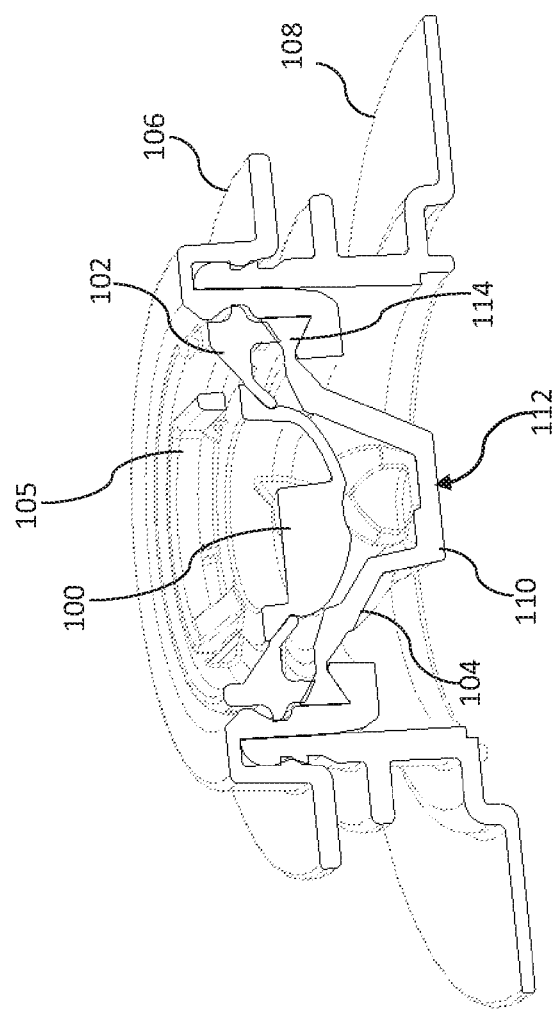
FIG. 11A illustrates a cutaway side view of another valve assembly according to certain inventive techniques.

FIG. 11A illustrates a cutaway side view of another valve assembly according to certain inventive techniques. As shown, a housing 106 is removably secured to a spout 108. A cap 100 is snapably secured to a retaining ring 102 by a snap-fit closure and/or other means. In some examples, the cap 100 includes a tab 105 to facilitate removal of the cap 100 from the retaining ring 102. The cap 100 may be connected to the ring 102 by a tether or hinge or other connection. The cap 100 is configured to be inserted into a valve 114 to prevent contaminants entering into the valve 114. In this example, one or more walls 104 of the valve 114 extend into the spout 108 to terminate at a surface 112. In the example of FIGS. 11A and 11B, walls 104 of the valve 114 can take a generally frustroconical shape that ends at the surface 112. Although illustrated as generally perpendicular to an axis extending through the center of the valve 114, the surface 112 may be angled, domed, or take a different form suitable for accepting an inserted tube.

As shown in FIGS. 11A and 11B, the walls 104 of the valve 114 can be formed with one or more angled surfaces 116, 118 that further narrow the walls as they terminate at the surface 112. In the illustrated example, the angled surfaces 116 and 118 may have different widths and/or extend from a base 113 of the valve 114 toward the surface 112 at different angles. In some examples, the angled surfaces 116, 118 are each defined by a single angle relative to the base 113. In other examples, the angled surfaces 116, 118 are defined by a gradual slope. In examples, a single angled surface extends from the base 113 to the surface 112. As the angled surface 116 approaches the plane defined by surface 112, a portion 110 is formed as two adjacent angled surfaces 116 terminate at the surface 112.

The surface 112 can be configured to provide an opening as the layer of material at the surface 112 is punctured by an inserted tube, such that the valve 114 normally remains closed in the absence of the inserted tube. For example, valve 114 can include a scoring pattern 111 to allow a protrusion, such as a dispensing tube, to break through the valve 114 at the surface 112 weakened by the scoring. The valve 114 can be made of flexible material such as TPE, such that the configuration of the wall 104 and the angled surfaces 116, 118 provide force toward the central axis of the valve 114 even after the surface 112 has been punctured by insertion of the tube. In some examples, one or more of the wall 104, the angled surfaces 116, 118, or the surface 112 has a thickness that is greater than another such surface. In examples, a thickness of the material used to form the valve 104 is generally greater than a valve configured for placement in a similar housing 106.

Figure 12B:
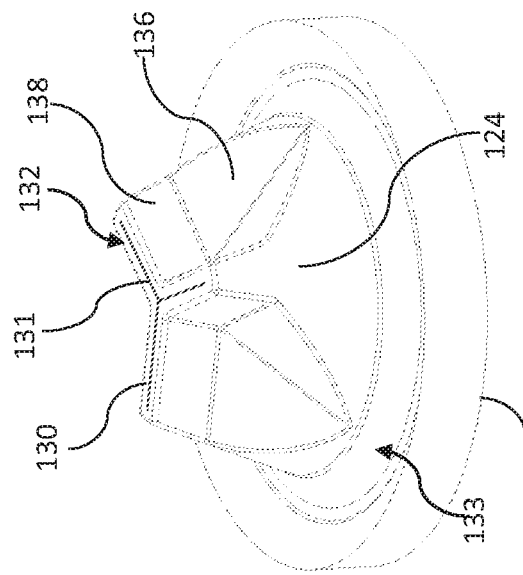
FIG. 12B illustrates a perspective view of the valve assembly illustrated in FIG. 12A according to certain inventive techniques.
Figure 12A:
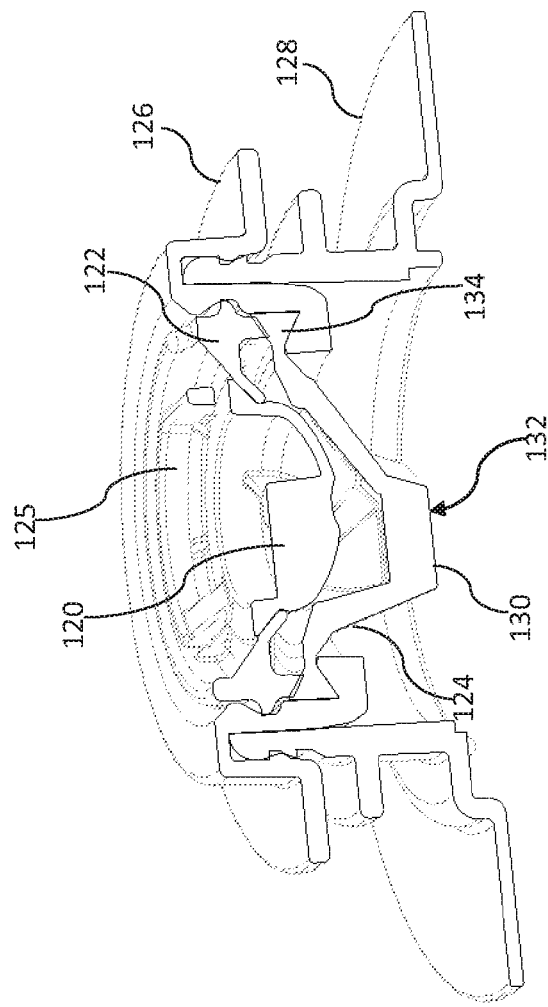
FIG. 12A illustrates a cutaway side view of another valve assembly according to certain inventive techniques.

FIG. 12A illustrates a cutaway side view of another valve assembly according to certain inventive techniques. As shown, a housing 126 is removably secured to a spout 128. A cap 120 is snapably secured to a retaining ring 122 by a snap-fit closure and/or other means. In some examples, the cap 120 includes a tab 125 to facilitate removal of the cap 120 from the retaining ring 122. The cap 120 may be connected to the ring 122 by a tether or hinge or other connection. The cap 120 is configured to be inserted into a valve 134 to prevent contaminants entering into the valve 134. In this example, one or more walls 124 of the valve 134 extend toward an opening of the spout 128 at a surface 132. In the example of FIGS. 12A and 12B, walls 124 can slope toward an axis extending through the center of the valve 134 such that the valve 134 takes a generally frustroconical shape that ends at the surface 132. Although illustrated as generally perpendicular to the axis extending through the center of the valve 134, the surface 132 may be angled, domed, or take a different form suitable for accepting an inserted tube.

As shown in FIGS. 12A and 12B, the walls 124 of the valve 134 can be formed with one or more angled surfaces 136, 138 that further narrow the walls as they terminate at the surface 132. In the illustrated example, the angled surfaces 136 and 138 may have different widths and/or extend from a base 133 of the valve 134 toward the surface 132 at different angles. As the angled surface 138 approaches the plane defined by surface 132, a portion 130 is formed as two adjacent angled surfaces 138 terminate at the surface 132. In some examples, the angled surfaces 136, 138 are each defined by a single angle relative to the base 133. In other examples, the angled surfaces 136, 138 are defined by a gradual slope. In examples, a single angled surface extends from the base 133 to the surface 132.

The surface 132 can be configured to provide an opening as the layer of material at the surface 132 is punctured by an inserted tube, forcing an opening at the portion 130. For example, valve 134 can include a scoring pattern 131 to allow a protrusion, such as a dispensing tube, to break through the valve 134 at the surface 132 weakened by the scoring. The walls 124 are arranged such that the valve 134 normally remains closed in the absence of the inserted tube. For example, the valve 134 can be made of flexible material such as TPE, such that the configuration of the angled surfaces 136, 138 provide force toward the central axis of the valve 134 even after the surface 132 has been punctured by insertion of the tube.

As shown, portion 130A forms a Y-shape, as three pair of angled surfaces 138 terminate at surface 132. One or more of the portions 130 can be separated by the force from insertion of a tube. For example, portions 130 may be scored to facilitate separation during insertion of the tube. Once separated, the walls 124 and angled surfaces 136, 118 flex around the tube to create an opening through which the fluid can flow through the valve 124 and into the inserted tube.

FIGS. 13A and 13B illustrate a cutaway side view of another valve assembly and a valve 134A, according to certain inventive techniques. The valve 134A is similar to valve 134, with four pair of angled surfaces 138A terminating at surface 132A to form an X-shape from portions 130A with a scoring pattern 131A on surface 132A, versus the Y-shaped surface 132 of FIGS. 12A and 12B.

The disclosed embodiments are not limited to the specific arrangement or components discussed with respect to those embodiments. For instance, the various embodiments that include a cap may alternatively not include a cap. Conversely, embodiments that do not include a cap may alternatively employ one in other embodiments. When a cap is employed, it may have be attached to a valve assembly in a variety of ways, such as disclosed herein.

The embodiments disclosed herein are not limited to the specific polymers or materials discussed with respect to those embodiments. Any number of different kinds of polymers having different properties can be used with the embodiments disclosed herein.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A valve assembly for use with a liquid container, comprising:
   a spout containing an opening to the liquid container, the spout configured to form a liquid-tight seal with an annular housing fitted over the opening;
   a sleeve extending through the opening and into the liquid container and configured to receive a dispensing tube; and
   a valve secured directly to the housing and coaxially received through the sleeve while forming a liquid-tight seal with the sleeve, the valve comprising a hollow, tubular body portion that includes a cutaway section and a leg fixed to the valve by a hinge and a bottom portion that seals to the sleeve when the valve is closed and, wherein the leg is configured to flex outwards against the sleeve upon insertion of the dispensing tube into the hollow, tubular body portion of the valve, thereby causing the cutaway section to open a flow channel to open the valve and allow liquid to flow through the valve assembly.

2. The valve assembly of claim 1, wherein the valve comprises a first material and the sleeve comprises a second material, the first material being rigid in comparison to the second material.

3. The valve assembly of claim 2, wherein the first material comprises a polyethylene material or a polypropylene material.

4. The valve assembly of claim 2, wherein the second material comprises a thermoplastic elastomer material.

5. The valve assembly of claim 1, further comprising a cap secured to the assembly, the cap configured to cover the valve in a first position and expose the valve in a second position.

6. The valve assembly of claim 1, wherein the valve is formed in an injection molding process.

\* \* \* \* \*